United States Patent
Johnes et al.

(10) Patent No.: US 10,960,594 B2
(45) Date of Patent: Mar. 30, 2021

(54) COEXTRUSION PROCESSES AND PRODUCTS PRODUCED THEREROM

(71) Applicant: Societe BIC S.A., Clichy (FR)

(72) Inventors: Michael Johnes, Hudson, FL (US);
Robert White, St. Petersburg, FL (US)

(73) Assignee: SOCIETE BIC S.A., Clichy (FR)

( * ) Notice: Subject to any disclaimer, the term of this patent is extended or adjusted under 35 U.S.C. 154(b) by 553 days.

(21) Appl. No.: 15/550,571

(22) PCT Filed: Feb. 4, 2016

(86) PCT No.: PCT/IB2016/000204
§ 371 (c)(1),
(2) Date: Aug. 11, 2017

(87) PCT Pub. No.: WO2016/128829
PCT Pub. Date: Aug. 18, 2016

(65) Prior Publication Data
US 2018/0029277 A1 Feb. 1, 2018

Related U.S. Application Data

(60) Provisional application No. 62/116,139, filed on Feb. 13, 2015.

(51) Int. Cl.
*B29C 48/09* (2019.01)
*B29C 48/21* (2019.01)
(Continued)

(52) U.S. Cl.
CPC ............. *B29C 48/09* (2019.02); *B29C 48/21* (2019.02); *B29C 48/92* (2019.02); *B43K 5/005* (2013.01);
(Continued)

(58) Field of Classification Search
CPC .................. B29C 48/09; B29C 48/92
See application file for complete search history.

(56) References Cited

U.S. PATENT DOCUMENTS

| 5,360,281 A | 11/1994 | Kamen et al. |
| 6,090,459 A | 7/2000 | Jadamus et al. |
| 2004/0018328 A1 | 1/2004 | Yamada et al. |

FOREIGN PATENT DOCUMENTS

| CN | 103737887 | 4/2014 |
| CN | 103737887 A | * 4/2014 |

(Continued)

OTHER PUBLICATIONS

Translation of CN103737887a.*
(Continued)

*Primary Examiner* — Marc C Howell
*Assistant Examiner* — Asha A Thomas
(74) *Attorney, Agent, or Firm* — Ohlandt, Greeley, Ruggiero & Perle, L.L.P.

(57) ABSTRACT

A method of coextruding polymeric materials into multiple layers of desired thickness to form a tubular workpiece. The method includes conveying a first polymeric material through a main extruder and a second polymeric material through a coextruder. The second polymeric material has dispersed therein an amount of electrically conductive particles effective to impart electrical conductivity to the tubular workpiece. The method further includes simultaneously extruding the first polymeric material and the second polymeric material through a coextrusion die to form the tubular workpiece. The tubular workpiece is extruded in the form of one or more outer layers having the first polymeric material and one or more inner layers comprising the second polymeric material. A tubular workpiece prepared by the method of coextruding polymeric materials into multiple layers of desired thickness. A system for coextruding polymeric mate-
(Continued)

rials into multiple layers of desired thickness to form a tubular workpiece is also provided.

11 Claims, 2 Drawing Sheets

(51) Int. Cl.
  *B29C 48/92* (2019.01)
  *B43K 8/00* (2006.01)
  *B43K 5/00* (2006.01)
  *B43K 7/00* (2006.01)
  *B43K 27/00* (2006.01)
  *B43K 15/00* (2006.01)
  *B29C 48/90* (2019.01)
  *B29C 48/00* (2019.01)

(52) U.S. Cl.
  CPC .............. *B43K 7/005* (2013.01); *B43K 8/003* (2013.01); *B43K 15/00* (2013.01); *B43K 27/006* (2013.01); *B29C 48/0022* (2019.02); *B29C 48/903* (2019.02); *B29C 2948/92609* (2019.02); *B29C 2948/92647* (2019.02); *B29C 2948/92942* (2019.02); *B29K 2995/0005* (2013.01)

(56) References Cited

FOREIGN PATENT DOCUMENTS

| EP | 0551094 A1 | 1/1993 | |
|---|---|---|---|
| EP | 0551094 A1 * | 7/1993 | ................ F16L 9/12 |
| EP | 0957148 A1 | 11/1999 | |
| EP | 1586511 A2 | 10/2005 | |
| EP | 1710482 A1 | 10/2006 | |

OTHER PUBLICATIONS

Chinese Office Action dated Oct. 12, 2019 in corresponding Chinese Patent Application No. 201680009927.9, 17 pages.
Chinese Office Action dated Feb. 2, 2019 from corresponding Chinese Patent Application No. 201680009927.9, 20 pages.
International Search Report dated Jun. 27, 2016 from corresponding PCT International application PCT/IB2016/000204, 3 pages.
Written Opinion dated Jun. 27, 2016 from corresponding PCT International application PCT/IB2016/000204, 7 pages.
Second Written Opinion dated Jan. 18, 2017 from corresponding PCT International application PCT/IB2016/000204, 6 pages.
International Preliminary Report on Patentability dated May 24, 2017 from corresponding PCT International application PCT/IB2016/000204, 9 pages.

* cited by examiner

COEXTRUSION PROCESSES AND PRODUCTS PRODUCED THEREROM

RELATED APPLICATIONS

This application is a 371 of International Patent Application No. PCT/IB2016/000204, filed Feb. 4, 2016, which claims priority to and the benefit of U.S. Provisional Patent Application No. 62/116,139, filed Feb. 13, 2015.

BACKGROUND OF THE DISCLOSURE

1. Field of the Disclosure

This disclosure relates to coextrusion processes and coextruded products produced therefrom. In particular, this disclosure relates to a method of coextruding polymeric materials, including at least one polymeric material having dispersed therein an amount of electrically conductive particles, into multiple layers of desired thickness to form a tubular workpiece (e.g., stylus barrel).

2. Description of the Related Art

Extruded polymers are used in many applications. Exemplary polymeric materials suitable for extrusion include crystalline polyolefins, such as polyethylene, polypropylene, and polybutylene; polyamides, such as nylon; polyesters such as polyethylene terephthalate (PET); and polyvinylidene fluoride. Although these polymeric materials and others are suitable for various uses, they can have limiting characteristics that substantially narrow their suitable uses. For example, polypropylene can have very good extrusion properties, but have less than desirable extrusion properties when coextruded with other polymeric materials that have additives dispersed therein.

Several different polymeric materials can be coextruded to form multilayer products. In general, each coextruded layer forms a separate continuous phase. Operating problems with coextrusion processes can result from coextrusions involving polymeric materials that have additives dispersed therein. Also, fusing or bonding between coextruded layers can be a problem especially for polymeric materials having additives (e.g., electrically conductive materials) dispersed therein.

Various methods have been described for producing coextruded polymeric products. The art continually searches for new coextrusion methods for preparing coextruded products. In particular, there is a need for coextrusion methods that successfully coextrude polymeric materials having additives (e.g., electrically conductive materials) dispersed therein.

EP 0 551 094 A1 is directed to a method of preparing a fluoropolymer composite fuel pipe or tube. The method includes the steps of activating a formed fluoropolymer substrate by subjecting the substrate to a charged gaseous atmosphere formed by electrically ionizing a gas that contacts the substrate, and thereafter applying a layer of a thermoplastic polymer to the activated fluoropolymer substrate. The ionizing step is a corona discharge or an electrically formed plasma. The fuel pipe or tube has an inner fluorocarbon layer having electrostatic discharge resistance and hydrocarbon evaporative emission resistance. The fuel pipe or tube has on top of and integral with, the fluorocarbon layer, an outer layer of a thermoplastic polymer.

U.S. Pat. No. 6,090,459 A is directed to a multilayer plastic composition having an outer layer of a thermoplastic molding composition, and an inner layer of an electrically conductive thermoplastic molding composition containing graphite fibrils. The multilayer plastic composition is useful for the transport of (petro)chemical materials and also in the motor vehicle sector for conveying brake, cooling and hydraulic fluid and also fuel.

EP 0 957 148 A1 is directed to an adhesive fluororesin (A) that has an ethylene-tetrafluoroethylene copolymer having at least one characteristic among a melt flow characteristic with a melt flow rate that is at least 40 and an infrared absorption characteristic that has a distinct absorption peak within a wavenumber range of from 1,720 to 1,800 cm$^{-1}$ in its infrared absorption spectrum. The adhesive fluororesin (A) is used in laminates made of resins to increase the interlaminar bond strength.

EP 1 710 482 A1 is directed to a multilayer tube for automobile piping. The multilayer tube has at least three layers including (1) a layer formed of polyamide 11 and/or polyamide 12, (2) a layer formed of a polyamide (semi-aromatic polyamide) comprising a dicarboxylic acid unit containing a terephthalic acid and/or naphthalenedicarboxylic acid unit in a proportion of 50 mol % or more based on all dicarboxylic acid units, and a diamine unit containing an aliphatic diamine unit having a carbon number of 9 to 13 in a proportion of 60 mol % or more based on all diamine units, and (3) a layer formed of a fluorine-containing polymer having introduced into the molecular chain thereof a functional group having reactivity with a polyamide-based resin. The multilayer tube is stated to have an alcohol gasoline permeation-preventing property, interlayer adhesion, low-temperature impact resistance, heat resistance and chemical resistance.

U.S. Pat. No. 5,360,281 discloses a cosmetic pencil barrel that is made by (a) mixing a molten thermoplastic composition comprising a foamable thermoplastic material; (b) extruding the mixture of step (a) through a crosshead die to form a continuous tubular extrudate; (c) introducing the tubular extrudate into a cooled water bath within a vacuum chamber through a calibrator designed to control foaming of the tubular extrudate; and (d) cutting the cooled tubular extrudate into the desired pencil length.

The present disclosure provides many advantages, which shall become apparent as described below.

SUMMARY OF THE DISCLOSURE

This disclosure relates, in part, to coextrusion processes and coextruded products produced therefrom. In particular, this disclosure relates to a method of coextruding polymeric materials, including at least one polymeric material having dispersed therein an amount of electrically conductive particles, into multiple layers of desired thickness to form a tubular workpiece (e.g., stylus barrel).

This disclosure also relates, in part, to a method of coextruding polymeric materials into multiple layers of desired thickness to form a tubular workpiece. The method includes using a coextrusion apparatus that comprises a main extruder, a coextruder and a coextrusion die in which the main extruder and the coextruder are operatively connected to the coextrusion die. The method also includes conveying a first polymeric material through the main extruder in which the main extruder has a stationary barrel and a rotating screw; and conveying a second polymeric material through the coextruder in which the coextruder has a stationary barrel and a rotating screw. The second polymeric material has dispersed therein an amount of electrically conductive particles effective to impart electrical conductivity to the tubular workpiece. The method further includes simultaneously extruding the first polymeric material through a first opening of the coextrusion die and the second polymeric material through a second opening of the coextrusion die with the first opening and second opening arranged so that the first and second polymeric materials merge and fuse together during the extruding, forming the tubular workpiece. The tubular workpiece is extruded in the form of one or more outer layers comprising the first polymeric material and one or more inner layers comprising the second polymeric material. The one or more outer layers have a thickness from about 1 to about 99 percent of the total thickness of the one or more outer layers and the one or more inner layers, and the one or more inner layers have a thickness from about 1 to about 99 percent of the total thickness of the one or more outer layers and the one or more inner layers.

This disclosure further relates, in part, to a method of coextruding polymeric materials into multiple layers of desired thickness to form a tubular workpiece. The method includes using a coextrusion apparatus that comprises a main extruder, a coextruder and a coextrusion die in which the main extruder and the coextruder are operatively connected to the coextrusion die. The method also includes providing one or more vacuum cooling tanks that are operatively connected to the coextrusion die; providing one or more cooling/warming tanks that are operatively connected to the one or more vacuum cooling tanks; and providing a puller/cutter that is operatively connected to the one or more cooling/warming tanks. The method further includes conveying a first polymeric material through the main extruder in which the main extruder has a stationary barrel and a rotating screw; and conveying a second polymeric material through the coextruder in which the coextruder has a stationary barrel and a rotating screw. The second polymeric material has dispersed therein an amount of electrically conductive particles effective to impart electrical conductivity to the tubular workpiece. The method yet further includes simultaneously extruding the first polymeric material through a first opening of the coextrusion die and the second polymeric material through a second opening of the coextrusion die with the first opening and second opening arranged so that the first and second polymeric materials merge and fuse together during the extruding, forming the tubular workpiece. The tubular workpiece is extruded in the form of one or more outer layers comprising the first polymeric material and one or more inner layers comprising the second polymeric material. The method also includes conveying the tubular workpiece through the one or more vacuum cooling tanks, the one or more cooling/warming tanks, and the puller/cutter. The tubular workpiece is cut into cross-sectional slices comprising barrels having a length from about 50 to about 500 millimeters, an internal diameter from about 4 to about 10 millimeters, and an external diameter from about 4 to about 25 millimeters. The one or more outer layers have a thickness from about 1 to about 99 percent of the total thickness of the one or more outer layers and the one or more inner layers, and the one or more inner layers have a thickness from about 1 to about 99 percent of the total thickness of the one or more outer layers and the one or more inner layers.

This disclosure yet further relates, in part, to a tubular workpiece prepared by a process of coextruding polymeric materials into multiple layers of desired thickness. The process includes using a coextrusion apparatus that comprises a main extruder, a coextruder and a coextrusion die in which the main extruder and the coextruder are operatively connected to the coextrusion die. The process also includes conveying a first polymeric material through the main extruder in which the main extruder has a stationary barrel and a rotating screw; and conveying a second polymeric material through the coextruder in which the coextruder has a stationary barrel and a rotating screw. The second polymeric material has dispersed therein an amount of electrically conductive particles effective to impart electrical conductivity to the tubular workpiece. The process further includes simultaneously extruding the first polymeric material through a first opening of the coextrusion die and the second polymeric material through a second opening of the coextrusion die with the first opening and second opening arranged so that the first and second polymeric materials merge and fuse together during the extruding, forming the tubular workpiece. The tubular workpiece is extruded in the form of one or more outer layers comprising the first polymeric material and one or more inner layers comprising the second polymeric material. The one or more outer layers have a thickness from about 1 to about 99 percent of the total thickness of the one or more outer layers and the one or more inner layers, and the one or more inner layers have a thickness from about 1 to about 99 percent of the total thickness of the one or more outer layers and the one or more inner layers.

This disclosure also relates, in part, to a tubular workpiece prepared by a process of coextruding polymeric materials into multiple layers of desired thickness. The process includes using a coextrusion apparatus that comprises a main extruder, a coextruder and a coextrusion die in which the main extruder and the coextruder are operatively connected to the coextrusion die. The process also includes providing one or more vacuum cooling tanks that are operatively connected to the coextrusion die; providing one or more cooling/warming tanks that are operatively connected to the one or more vacuum cooling tanks; and providing a puller/cutter that is operatively connected to the one or more cooling/warming tanks. The process further includes conveying a first polymeric material through the main extruder in which the main extruder has a stationary barrel and a rotating screw; and conveying a second polymeric material through the coextruder in which the coextruder has a stationary barrel and a rotating screw. The second polymeric material has dispersed therein an amount of electrically conductive particles effective to impart electrical conductivity to the tubular workpiece. The process yet further includes simultaneously extruding the first polymeric material through a first opening of the coextrusion die and the second polymeric material through a second opening of the coextrusion die with the first opening and second opening arranged so that the first and second polymeric materials merge and fuse together during the extruding, forming the tubular workpiece. The tubular workpiece is extruded in the form of one or more outer layers comprising the first polymeric material and one or more inner layers comprising the second polymeric material. The process also includes conveying the tubular workpiece through the one or more vacuum cooling tanks, the one or more cooling/warming tanks, and the puller/cutter. The tubular workpiece is cut into cross-sectional slices comprising barrels having a length from about 50 to about 500 millimeters, an internal diameter from about 4 to about 10 millimeters, and an external diameter from about 4 to about 25 millimeters. The one or more outer layers have a thickness from about 1 to about 99 percent of the total thickness of the one or more outer layers, and the one or more inner layers, and the one or more inner layers have a thickness from about 1 to about 99 percent of the total thickness of the one or more outer layers and the one or more inner layers.

This disclosure further relates, in part, to a system for coextruding polymeric materials into multiple layers of desired thickness to form a tubular workpiece. The system includes a coextrusion apparatus that comprises a main extruder, a coextruder and a coextrusion die, with the main extruder and the coextruder being operatively connected to the coextrusion die; one or more vacuum cooling tanks that are operatively connected to the coextrusion die; one or more cooling/warming tanks that are operatively connected to the one or more vacuum cooling tanks; and a puller/cutter that is operatively connected to the one or more cooling/warming tanks. The system is capable of simultaneously extruding a first polymeric material and a second polymeric material in which the second polymeric material has dispersed therein an amount of electrically conductive particles effective to impart electrical conductivity to the tubular workpiece, to form the tubular workpiece. The tubular workpiece is extruded in the form of one or more outer layers comprising the first polymeric material and one or more inner layers comprising the second polymeric material. The one or more outer layers have a thickness from about 1 to about 99 percent of the total thickness of the one or more outer layers and the one or more inner layers, and the one or more inner layers have a thickness from about 1 to about 99 percent of the total thickness of the one or more outer layers and the one or more inner layers.

Further objects, features and advantages of the present disclosure will be understood by reference to the following drawings and detailed description.

DESCRIPTION OF THE PREFERRED EMBODIMENTS

Coextrusion is the simultaneous extrusion of two or more polymers through a die where the polymers are joined together such that they form distinct, well-bonded layers forming a single product. As described herein, polymers can be divided in three main groups, namely, thermoplastics, thermosets and elastomers. In an embodiment, the process of this disclosure is used to add an internal conductive layer to extruded barrels that are used in making stylus products.

Generally, in accordance with the process of this disclosure, a first polymeric material that forms an outer decorative stylus barrel layer that is natural in color or colored using a color concentrate additive(s) and a second polymeric material that forms an inner conductive layer are combined together to form a pen barrel that is conductive for use as a stylus pen. The first polymeric material, in raw form, is conveyed through the in-line extruder also known as the main extruder where the barrel is stationary and the screw is rotating. As the material moves forward, it heats up as a result of frictional heat generation and heat conducted from the barrel heaters. When the material reaches the end of the screw, it will be at the desired heat profile of the material and is pumped into a coextrusion die.

The second polymeric material, in its raw form, is conveyed to a coextruder where the machine barrel is stationary and the screw is rotating. As the material moves forward, it heats up as a result of frictional heat generation and heat conducted from the barrel heaters. When the material reaches the end of the screw, it will be at the desired heat profile of the material and is pumped into the coextrusion die. Each extruder has its own separate and unique head pressure and melt profile. Each material can have different or same melt temperatures as it enters the co-extrusion die.

In the coextrusion die, the two melt streams are introduced together at similar or different melt temperatures. The coextruded conductive layer material is overlaid by the main extruded decorative layer material. The decorative layer can be controlled by the coextrusion die to range from 1% to 99% of total thickness, and the conductive layer can be controlled by the coextrusion die to also range from 1% to 99%, to add up to 100% total layer.

The molten coextruded tube leaves the coextrusion die and enters a vacuum cooling tank though the sizing rings. The tube is held under constant vacuum and temperature to maintain dimensional size and shape.

The shaped coextruded tube leaves the vacuum tank and enters a cooling/warming tank to prepare the tube to be cut to length at atmospheric pressure and a set constant temperature.

Figure 1:
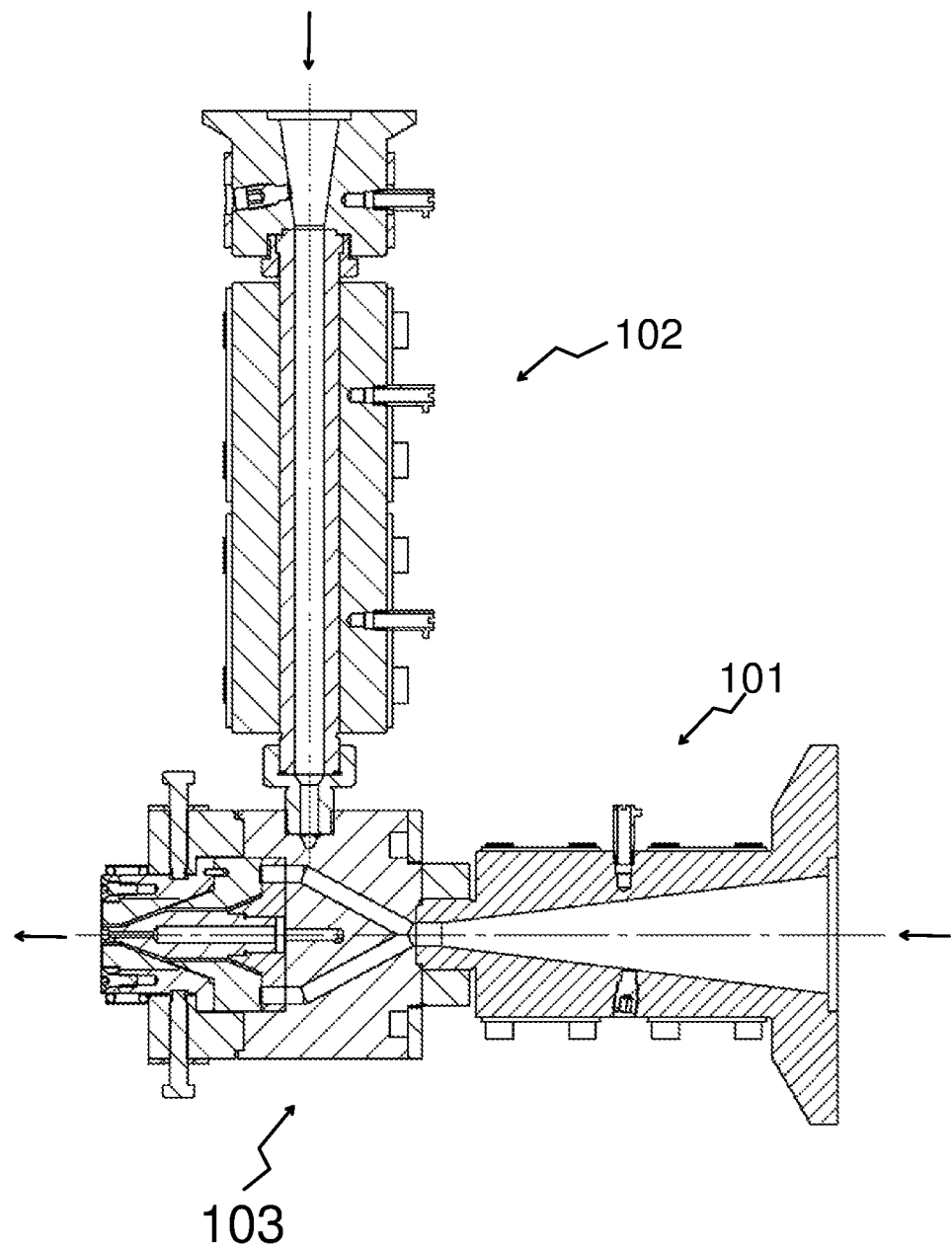
FIG. 1 is a cross-sectional perspective view of an illustrative coextrusion apparatus useful in this disclosure.

The coextruded tube leaves the cooling/warming tank and enters a puller/cutter. The puller/cutter pulls the co-extruded tube at a set speed to control outside diameter (OD), inside diameter (ID), wall thickness as relative to rate of speed being drawn down on the die and amount or vacuum in the tank and length as relative to the speed of the fly wheel cutter. The coextruded tube leaves the front of the puller and enters directly into the fly wheel cutter. The fly wheel cutter is set at a certain speed and paired with the puller speed to give a desired length of cut to the co-extruded tube. The cut co-extruded tube is now a stylus pen barrel and packaged in sleeves for assembly in production The process of this disclosure is described more particularly with reference to FIGS. 1 and 2. The method of this disclosure involves coextruding polymeric materials into multiple layers of desired thickness to form a tubular workpiece (e.g., stylus barrel). The illustrative coextrusion apparatus shown in FIG. 1 has a main extruder 101, a coextruder 102 and a coextrusion die 103. The main extruder 101 has a stationary barrel and a rotating screw. The coextruder 102 has a stationary barrel and a rotating screw. The main extruder 101 and the coextruder 102 are operatively connected to the coextrusion die 103.

A first polymeric material (e.g., polypropylene) is conveyed through the main extruder 101 or the coextruder 102. A second polymeric material is conveyed through the coextruder 102 or the main extruder 101. The second polymeric material has dispersed therein an amount of electrically conductive particles (e.g., polypropylene plus carbon black filler) effective to impart electrical conductivity to the tubular workpiece.

The process involves simultaneously extruding the first polymeric material through a first opening of the coextrusion die 103 and the second polymeric material through a second opening of the coextrusion die 103. The first polymeric material and the second polymeric material can have the same or different melt temperatures upon entering the coextrusion die 103. The first opening and second opening are arranged so that the first and second polymeric materials merge and fuse together during the extruding to form the tubular workpiece. Preferably, the tubular workpiece is extruded in the form of one or more outer layers comprising the first polymeric material and one or more inner layers comprising the second polymeric material.

Illustrative polymeric materials useful in the methods of this disclosure include, for example, thermoplastic, thermoset, elastomeric, and the like. Preferably, the polymeric material is a thermoplastic material.

Illustrative thermoplastic materials useful in the methods of this disclosure include, for example, polyethylene, polypropylene, polycarbonate, polyamide, polyvinylchloride, polyvinylidene chloride, polyacrylonitrile, polystyrene, copolymers of any of the above materials, and the like.

Illustrative thermoset materials useful in the methods of this disclosure include, for example, polyester, phenol formaldehyde resin, polyisocyanurate, silicone, urea formaldehyde, vinyl ester, polyimide, epoxy, melamine resin, and the like.

Illustrative elastomeric materials useful in the methods of this disclosure include, for example, polyisoprene, polybutadiene, styrene-butadiene, epichlorohydrin, fluoroelastomer, polyether block amides, ethylene-vinyl acetate, and the like.

Combinations of polymeric materials can also be useful in the methods of this disclosure and can include, for example, combinations of thermoplastic materials, combinations of thermoset materials, combinations of elastomeric materials, combinations of any of thermoplastic materials, thermoset materials, elastomeric materials, and the like.

Any suitable polymer that can be formed into tubular workpieces can be used as the thermoplastic resin of the layers of the stylus barrels of this disclosure. Polymers used for adjacent layers can be the same or different and should be compatible in the sense that they can be adhered to each other by heat, pressure, ultrasonic bonding, adhesive, any combination of these, or other suitable bonding means. Illustrative of such polymers are polyamide, linear polyester, and one or more polymers of unsubstituted or substituted olefin monomers, such as polyvinyl chloride, polyacrylamide, polyacrylonitrile, polyvinyl acetate, polyacrylic acid, polyvinyl methyl ether, polyethylene, polypropylene, poly (1-hexene), poly(4-methyl-1-pentene), poly(1-butene), poly (3-methyl-1-butene), poly(3-phenyl-1-propene) and poly (vinylcyclohexane). A homopolymer and copolymer are suitable as are blends of such polymers with one or more other thermoplastic polymers.

Homopolymer and copolymer based on alpha-olefin monomers of 2 to about 12 carbon atoms and mixtures thereof, such as polyethylene, polypropylene, ethylene-propylene copolymer, polyisobutylene, poly(4-methyl-1-pentene), poly(1-butene), poly(1-hexene), poly(5-methyl-1-hexene) and the like, are preferred. Particularly preferred polyalpha-olefin resins are high, low and linear low density polyethylene, polypropylene, and propylene-dominated copolymer. Propylene polymer resins are most preferred due to their cost, processability and performance.

The propylene polymer resin most preferred for preparing the tubular workpieces comprise substantially crystalline homopolymers of propylene or copolymers of propylene with minor amounts, e.g., up to about 30 mole %, of one or more other copolymerizable alpha-olefins, such as ethylene, butene-1 and pentene-1, or blends of propylene polymer with minor amounts, e.g. up to about 20 weight %, of another polyolefin, such as low or linear low density polyethylene. Such propylene polymers are well known and commercially available. A particularly preferred propylene polymer resin is homopolymer polypropylene.

Propylene polymer resin into which the electrically conductive particles are incorporated desirably has a melt flow rate of about 1.5 to about 20 grams per 10 minutes to obtain barrel properties suited to end-use requirements while also facilitating dispersion of conductive particles at loadings high enough to confer substantial electrical conductivity. Polypropylene resins of greater melt viscosity, e.g., melt flow rates below about 1.5 grams per 10 minutes, are less useful because dispersion of electrically conductive particles is difficult. Degradation of propylene polymer during processing can result in melt flow rate increases to up to about two times that of the starting material and, in turn, low melt strength during extrusion and weak tubular workpieces with nonuniform thickness. Accordingly, low melt viscosity propylene polymers, e.g., melt flow rates above about 20 grams per 10 minutes, are not preferred. Preferably, the propylene polymer has a melt flow rate of about 2 to about 15 grams per 10 minutes to obtain good dispersion of electrically conductive particles and ensure formation of tubular workpieces of substantially uniform thicknesses.

When propylene polymer is used as the thermoplastic polymer to form the layer at least substantially free of conductive particles, melt flow rates of such polymer suitably range from about 2 to about 20 grams per 10 minutes, and preferably from about 2.5 to about 15 grams per 10 minutes. When the tubular workpiece is formed by coextrusion, the melt flow rate of the composition comprising conductive particles and thermoplastic polymer utilized for the conductive surface layer or layers is at most equal to, and preferably somewhat lower than, that of the composition used for the substantially nonconductive layer so that the greater melt strength of the former will compensate for the strength-diminishing effect of the conductive particles while the greater flow rate of the latter will, at the same time, promote smooth extrusion of the more viscous filled resin composition.

Most preferably, when preparing the tubular workpieces with coextrusion, a composition comprising propylene polymer having a melt flow rate of about 2 to about 5 grams per 10 minutes, and electrically conductive parties, is used for the conductive layer or layers, and a composition comprising propylene polymer resin having a melt flow rate of about 3 to about 8 grams per 10 minutes and at least substantially free of conductive particles is used for the substantially nonconductive layer or layers. Preferably, in coextrusion operations, the ratio of the melt flow rate of the composition used for the conductive layer or layers to the melt flow rate of the propylene polymer resin composition used for the substantially nonconductive layer or layers is about 0.1:1 to about 0.5:1, and preferably about 0.2:1 to about 0.4:1. Except as stated otherwise, melt flow rates referred to herein are determined according to ASTM D-1238 at 230° C. and a load of 2.16 kg.

Illustrative electrically conductive particles useful in the methods of this disclosure include, for example, carbon black, carbon nanotube, carbon fiber, carbon nanotube wire, and the like. Combinations of the electrically conductive particles can also be useful in the methods of this disclosure. The electrically conductive particles are used in an amount sufficient to impart electrical conductivity to the one or more inner layers comprising the second polymeric material.

In general, electrically conductive particles useful according to this disclosure include carbon black, carbon nanotube, carbon fiber, carbon nanotube wires, metallic powder, particulate, and the like. Combinations of the electrically conductive particles can also be useful in the methods of this disclosure. Useful metals include iron, aluminum, silver and copper. The particles should be fine enough to be dispersible in the thermoplastic polymer used for the conductive layer or layers. Generally, average particle sizes less than about 25 microns give good results although for a given material, thermoplastic resin and barrel production process, greater particle sizes can be beneficial. Carbon black and carbon nanotube(s) are preferred conductive materials because of their relatively low cost, dispersability in thermoplastic resin and chemical inertness. These materials also are better suited to plastic recycling than metallic particles or powders.

Depending on properties, carbon black is capable of imparting high electrical conductivity, on the one hand, or extreme resistivity on the other hand. In the present disclosure, electrically conductive carbon black is used to impart conductivity so that electrons can flow through the barrel layer or layers having dispersed carbon black. Electrical conductivity of conductive carbon black is related to its particle size, structure, and volatiles content. Conductivity achieved through use of carbon black according to this disclosure results from dispersion, within a thermoplastic resin matrix or continuous phase, of electrically conductive carbon black particles with substantial particle-to-particle contact throughout the conductive layer or layers of the stylus barrels of this disclosure.

In an embodiment, the carbon black can be fairly complex in structure and easily dispersed in the thermoplastic resin used to form the conductive layer or layers. So-called medium and high structure carbon blacks include generally bulky, more-or-less irregularly shaped primary aggregates of relatively low density and composed of many prime particles with branching and chaining. Such medium to high structure carbon black is well suited for use in a stylus barrel because of its high conductivity and good dispersability. Less highly structured carbon black can also be useful but may require higher loading levels than the high or medium structure carbon blacks, and with attendant losses of strength and elongation, to achieve good conductivities.

Suitably, the average particle size of the carbon black is about 15 to about 35 nm. Preferably, the average particle size is about 20 to about 30 nm. Typical properties include nitrogen surface areas of 250 m$^2$/g and 140 m$^2$/g having average particle sizes of 30 nm and 20 nm, respectively, volatiles contents of 1.5% and 1.4%, respectively, and densities of 6 lb/ft$^3$ (0.096 g/cm$^3$) and 14 lb/ft$^3$ (0.224 g/cm$^3$), respectively.

Combinations of different carbon blacks can be employed if desired to obtain benefits from each. Conductivity also depends on the level of dispersion of the carbon black or other conductive particles in the conductive layer or layers of the stylus barrel. Concentrating the conductive particles in the inner surface layer(s) of the stylus barrels promotes efficient usage of conductive particles. Suitably, about 5 to about 40 weight percent of the electrically conductive layer is conductive particles. Below about 5 weight percent, conductivity can be inadequate while above about 40 weight percent, extrusion of conductive layers of uniform thickness is difficult and strength and elongation of the final tubular workpieces can be too low for use as stylus barrels. Use of too much conductive carbon black can also lead to diminished conductivity due to shearing and destruction of carbon black particles. When using electrically conductive carbon black, about 25 to about 35 weight percent conductive carbon black is preferred to impart conductivity with good strength and elongation without complicating extrusion.

Figure 2:
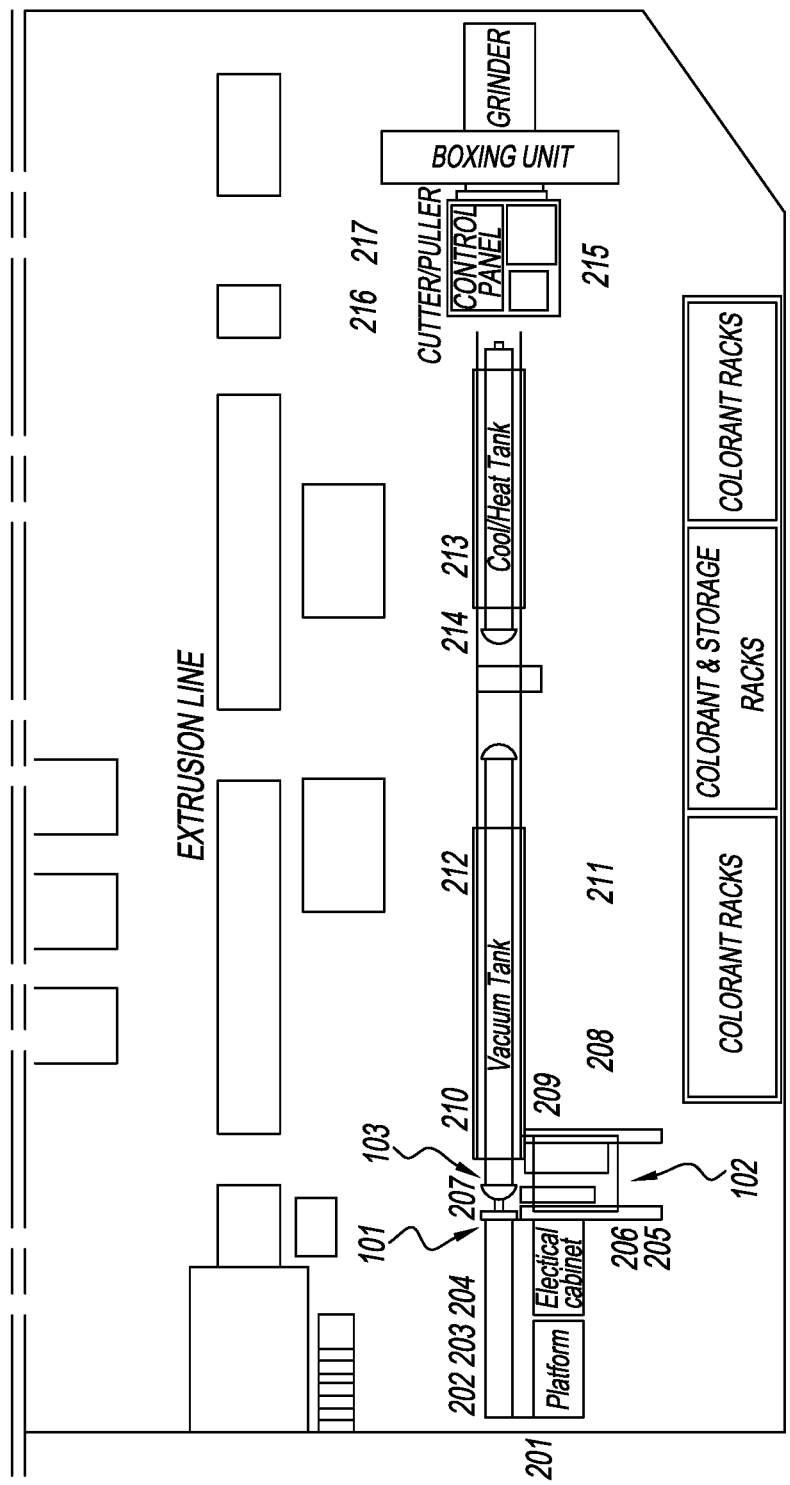
FIG. 2 is a flow diagram of an illustrative coextrusion process in accordance with this disclosure.

Referring to FIG. 2, a preferred coextrusion method of this disclosure is shown. At 201, a color feeder setting is positioned in proximity to the main extruder 101. The color feeder controls the amount of color agent added to the first polymeric material. The first polymeric material can be natural in color or colored using a color concentrate additive(s).

At 202, a line speed control device is positioned in proximity to the main extruder 101 to control the speed of the extruded material. The co-extruded tube is drawn down at a set speed to control outside outside diameter (OD), inside diameter (ID), and wall thickness.

Also, positioned in proximity to the main extruder 101, a main extruder heat profile is shown at 203, and a main extruder head pressure and screw speed indicator are shown at 204. In an embodiment, the main extruder 101 is operated at a head pressure from about 2000 psi to about 6000 psi, a temperature from about 165° C. to about 260° C., and a rotating screw speed from about 50 to about 100 revolutions per minute. Preferably, the main extruder 101 is operated at a head pressure from about 2000 psi to about 6000 psi, a temperature from about 170° C. to about 250° C., and a rotating screw speed from about 60 to about 90 revolutions per minute Positioned in proximity to the coextruder 102, a coextruder heat profile is shown at 205, and a coextruder head pressure and screw speed indicator at 206. In an embodiment, the coextruder 102 is operated at a head pressure from about 2000 psi to about 6000 psi, a temperature from about 170° C. to about 275° C., and a rotating screw speed from about 75 to about 125 revolutions per minute. Preferably, the coextruder 102 is operated at a head pressure from about 2000 psi to about 6000 psi, a temperature from about 190° C. to about 260° C., and a rotating screw speed from about 85 to about 115 revolutions per minute.

Following the extrusion line, an entrance plate water setting is positioned at 207. An OD gauge is positioned at 208. The OD gauge measures in process the OD of the tubular workpiece.

After leaving the coextrusion die 103, the extrusion line includes one or more vacuum cooling tanks that are operatively connected to the coextrusion die; one or more cooling/warming tanks that are operatively connected to the one or more vacuum cooling tanks; and a puller/cutter that operatively connected to the one or more cooling/warming tanks.

After leaving the coextrusion die, the molten coextruded tubular workpiece enters the vacuum cooling tank though sizing rings. The first vacuum cooling tank is operatively connected to the coextrusion die. The tube is held under constant vacuum and temperature to maintain dimensional size and shape. The one or more vacuum cooling tanks are operated at a vacuum pressure from about 2.5 to about 12.5 psia (position 209) and a water temperature from about 15° C. to about 38° C. (position 210). Preferably, the one or more vacuum cooling tanks are operated at a vacuum pressure from about 4.5 to about 10.5 psia (position 211) and a water temperature from about 21° C. to about 33° C. (position 212).

The shaped co-extruded tube leaves the vacuum tank and enters a cooling/warming tank to prepare the tube to be cut to length at atmospheric pressure and a set constant temperature. The one or more cooling/warming tanks that are operatively connected to the one or more vacuum cooling tanks. The one or more cooling/warming tanks are operated at a temperature from about 26° C. to about 49° C. Preferably, the one or more cooling/warming tanks are operated at a temperature from about 33° C. to about 44° C. (position 213).

A temperature control unit (e.g., thermolator) is located at 214. The temperature control unit prepares the tube to be cut to length at atmospheric pressure and a set constant temperature.

The coextruded tube leaves the cooling/warming tank and enters the puller/cutter. The puller/cutter pulls the co-extruded tube at a set speed to control OD, ID, wall thickness as relative to rate of speed being drawn down on the coextrusion die and amount or vacuum in the tank and length as relative to the speed of the fly wheel cutter. The co-extruded tube leaves the front of the puller and enters directly into the fly wheel cutter. The fly wheel cutter is set at a certain speed and paired with the puller speed to give a desired length of cut to the co-extruded tube. The cut co-extruded tube is now a stylus pen barrel and packaged in sleeves for assembly in production.

A puller belt height setting device is located at 215. A line speed control from the cutter is located at 216. At specified cutter settings, the puller/cutter pulls the co-extruded tube at a set speed to control OD, ID, wall thickness as relative to rate of speed being drawn down on the coextrusion die and amount or vacuum in the tank and length as relative to the speed of the fly wheel cutter. The tubular workpiece is pulled at a set speed to control OD, ID, wall thickness, and length of cut.

A cutter setting device is positioned at 217. The coextruded tube leaves the front of the puller and enters directly into the fly wheel cutter. The fly wheel cutter is set at a certain speed and paired with the puller speed to give a desired length of cut to the co-extruded tube. The cut co-extruded tube is now a stylus pen barrel and packaged in sleeves for assembly in production. The puller/cutter is operated at a speed from about 1 to about 400 feet per minute and a cut frequency from about 1 to about 800 cuts per minute. Preferably, the puller/cutter is operated at a speed from about 225 to about 375 feet per minute and a cut frequency from about 450 to about 750 cuts per minute.

In an embodiment, the tubular workpiece is cut into cross-sectional slices comprising barrels having a length from about 50 to about 500 millimeters, an internal diameter from about 4 to about 10 millimeters, and an external diameter from about 4 to about 25 millimeters. Preferably, the barrels have a length from about 75 to about 475 millimeters, an internal diameter from about 5 to about 9 millimeters, and an external diameter from about 5 to about 20 millimeters.

In yet another embodiment, the tubular workpiece is cut into cross-sectional slices comprising barrels having a length from about 100 to about 450 millimeters, an internal diameter from about 4 to about 10 millimeters, and an external diameter from about 6 to about 18 millimeters. Preferably, the barrels have a length from about 125 to about 400 millimeters, an internal diameter from about 5 to about 9 millimeters, and an external diameter from about 8 to about 16 millimeters.

Additional processing steps can be used to further modify the tubular workpieces. For example, one or more grinding operations can be performed. Grinding can include the process of removing material via abrasion as, for example, from materials too hard to be machined. Grinding can be performed to achieve several effects, including for example: (1) shaping the barrels, and/or (2) obtaining a high degree of dimensional accuracy and/or surface finish. The grinding process can include a rough grind that can remove a majority of material and then a fine grind to create the final tubular shape.

In another embodiment, the one or more outer layers have a thickness from about 1 to about 99 percent, or from about 1 to about 50 percent, or from about 1 to about 25 percent, of the total thickness of the one or more outer layers and the one or more inner layers. The one or more inner layers have a thickness from about 1 to about 99 percent, or from about 1 to about 50 percent, or from about 1 to about 25 percent, of the total thickness of the one or more outer layers and the one or more inner layers.

In yet another embodiment, the one or more outer layers have a thickness from about 1 to about 99 percent, preferably from about 1 to about 96 percent, of the total thickness of the one or more outer layers and the one or more inner layers, and the one or more inner layers have a thickness from about 1 to about 25 percent, preferably from about 1 to about 15 percent or less, more preferably from about 1 to about 10 percent or less, of the total thickness of the one or more outer layers and the one or more inner layers.

Typically, the one or more outer layers have a thickness from about 0.01 to about 1.6 millimeters, and the one or more inner layers have a thickness from about 0.01 to about 0.4 millimeters. Preferably, the one or more outer layers have a thickness from about 0.09 to about 1.4 millimeters, and the one or more inner layers have a thickness from about 0.01 to about 0.35 millimeters.

In a preferred embodiment, the one or more outer layers comprise one or more decorative layers, the first polymeric material comprises one or more color additives, the tubular workpiece comprises one or more conductive layers overlaid by one or more decorative layers, and the cross-sectional slices of the tubular workpiece comprise stylus barrels. Preferably, the tubular workpiece comprises one conductive layer overlaid by one decorative layer. The conductive layer preferably comprises polypropylene having carbon black filler dispersed therein, and the decorative layer preferably comprises polypropylene.

While two-layered constructions are preferred, this disclosure contemplates additional layers, if desired. For example, additional layers of thermoplastic resin compositions can be incorporated to impart special characteristics, such as additional strength, antimicrobial properties or other properties, to the barrels prepared therefrom. Irrespective of the number of layers, barrels that are most preferred have an inner layer capable of dissipating electrical charge. In this respect, two-layered barrels are most preferred from the standpoint of cost, ease of manufacture and performance.

If desired, one or more layers of the stylus barrels also can have additives incorporated therein to impart other characteristics thereto, provided such additives do not interfere with the strength and electrically conductive properties of the stylus barrels or their manufacture. Examples of useful additives include one or more antioxidants; antistatic agents; lubricants; ultraviolet light absorbers; pigments such as titanium dioxide and nonconductive carbon black; delusterant, heat, light and oxidation stabilizers; opacifiers such as chalk and calcium carbonate; antimicrobial agents such as 2,4,4'-trichloro-2'-hydroxydiphenyl ether; flame retardants and various fillers such as talc, calcium carbonate, gypsum, kaoline, silica, and diatomaceous earth. Average particle diameter of such fillers should generally not exceed about 5 μm, and desirably is about 1 to about 3 μm. When filler is used in one or more layers, each such layer preferably comprises no more than about 10 weight percent filler, and more preferably about 0.5 to about 6 weight percent, based on the weight of the polymer component. Higher levels can interfere with processability and dispersion of conductive particles.

In an embodiment, this disclosure relates to a system for coextruding polymeric materials into multiple layers of desired thickness to form a tubular workpiece. The system comprises a coextrusion apparatus that includes a main extruder, a coextruder and a coextrusion die. The system further comprises one or more vacuum cooling tanks, one or more cooling/warming tanks, and a puller/cutter. The main extruder and the coextruder are operatively connected to the coextrusion die. The one or more vacuum cooling tanks are operatively connected to the coextrusion die. The one or more cooling/warming tanks are operatively connected to the one or more vacuum cooling tanks. The puller/cutter is operatively connected to the one or more cooling/warming tanks. The system can be operated manually, or can be automated, or the system can be a combination of manual and automated operation. For an automated system in whole or in part, a processor can be included for controlling operating conditions of the system.

The steps and/or actions of the method described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be connected to the processor, such that the processor can read information from, and write information to, the storage medium. In the alternative, the storage medium can be integral to the processor. Further, in some embodiments, the processor and the storage medium can reside in an Application Specific Integrated Circuit (ASIC). In the alternative, the processor and the storage medium can reside as discrete components in a computing device. Additionally, in some embodiments, the events and/or actions of the method can reside as one or any combination or set of codes and/or instructions on a machine-readable medium and/or computer-readable medium, which can be incorporated into a computer program product.

In one or more embodiments, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc" as used herein, include compact disc (CD), laser disc, optical disc, digital versatile disc (DVD), floppy disk and blu-ray disc where disks usually reproduce data magnetically, while discs usually reproduce data optically with lasers. Combinations of the above are included in the scope of computer-readable media.

Computer program code for carrying out operations of embodiments of the present disclosure can be written in an object oriented, scripted or unscripted programming language such as Java, Perl, Smalltalk, C++, or the like. However, the computer program code for carrying out operations of embodiments of the present disclosure can also be written in conventional procedural programming languages, such as the "C" programming language or similar programming languages.

Embodiments of the present disclosure are described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer readable memory produce an article of manufacture including instruction means that implement the function/act specified in the flowchart and/or block diagram block(s).

The computer program instructions can also be loaded onto a computer or other programmable data processing apparatus to cause a series of operational steps to be performed on the computer or other programmable apparatus to produce a computer-implemented process so that the instructions that execute on the computer or other programmable apparatus provide steps for implementing the functions/acts specified in the flowchart and/or block diagram block(s). Alternatively, computer program implemented steps or acts can be combined with operator or human implemented steps or acts in order to carry out an embodiment of the present disclosure.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit this disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

While we have shown and described several embodiments in accordance with our disclosure, it is to be clearly understood that the same can be susceptible to numerous changes apparent to one skilled in the art. Therefore, we do not wish to be limited to the details shown and described but intend to show all changes and modifications that come within the scope of the appended claims.

What is claimed is:

1. A method of coextruding polymeric materials into multiple layers of desired thickness to form a tubular workpiece, the method comprising:

providing a coextrusion apparatus that comprises a main extruder, a coextruder and a coextrusion die, the main extruder having a stationary barrel and a rotating screw, the coextruder having a stationary barrel and a rotating screw, wherein the main extruder and the coextruder are operatively connected to the coextrusion die, wherein the coextrusion apparatus also comprises one or more vacuum cooling tanks that are operatively connected to the coextrusion die, one or more cooling/warming tanks that are operatively connected to the one or more vacuum cooling tanks, and a puller/cutter that is operatively connected to the one or more cooling/warming tanks;

conveying a first polymeric material through the main extruder;

conveying a second polymeric material through the coextruder, the second polymeric material having dispersed therein an amount of electrically conductive particles effective to impart electrical conductivity to the tubular workpiece;

simultaneously extruding the first polymeric material through a first opening of the coextrusion die and the second polymeric material through a second opening of the coextrusion die, the first opening and second opening being arranged so that the first and second polymeric materials merge and fuse together during the extruding, forming the tubular workpiece, the tubular workpiece being extruded in the form of one or more outer layers comprising the first polymeric material and one or more inner layers comprising the second polymeric material;

conveying the tubular workpiece through the one or more vacuum cooling tanks, the one or more cooling/warming tanks, and the puller/cutter; and cutting cross-sectional slices from the tubular workpiece with the puller/cutter, wherein the cross-sectional slices from the tubular workpiece comprise stylus pen barrels having a length from about 50 to about 500 millimeters, an internal diameter from about 4 to about 10 millimeters, and an external diameter from about 4 to about 25 millimeters;

wherein the one or more outer layers have a thickness from about 1 to about 99 percent of the total thickness of the one or more outer layers and the one or more inner layers, and wherein the one or more inner layers have a thickness from about 1 to about 99 percent of the total thickness of the one or more outer layers and the one or more inner layers; and wherein the main extruder is operated at a head pressure from about 2000 psi to about 6000 psi, a temperature from about 165° C. to about 260° C., and a rotating screw speed from about 50 to about 100 revolutions per minute; wherein the coextruder is operated at a head pressure from about 2000 psi to about 6000 psi, a temperature from about 170° C. to about 275° C., and a rotating screw speed from about 75 to about 125 revolutions per minute; and wherein the puller/cutter is operated at a speed from about 1 to about 400 feet per minute and a cut frequency from about 1 to about 800 cuts per minute.

2. The method of claim 1, wherein the one or more vacuum cooling tanks are operated at a vacuum pressure from about 2.5 to about 12.5 psia and a water temperature from about 15° C. to about 38° C., and wherein the one or more cooling/warming tanks are operated at a temperature from about 26° C. to about 49° C.

3. The method of claim 1, wherein the tubular workpiece is held at constant vacuum and temperature to maintain dimensional size and shape when in the one or more vacuum cooling tanks, wherein the tubular workpiece is prepared to be cut to length at atmospheric pressure and a set constant temperature when in the one or more cooling/warming tanks, and wherein the tubular workpiece is pulled at a set speed to control outside diameter, internal diameter, wall thickness, and length of cut when in the puller/cutter.

4. The method of claim 1, wherein the one or more outer layers have a thickness from about 1 to about 99 percent of the total thickness of the one or more outer layers and the one or more inner layers, and wherein the one or more inner layers have a thickness from about 1 to about 25 percent of the total thickness of the one or more outer layers and the one or more inner layers.

5. The method of claim 1, wherein the one or more outer layers have a thickness from about 0.01 to about 1.6 millimeters, and wherein the one or more inner layers have a thickness from about 0.01 to about 0.4 millimeters.

6. The method of claim 1, wherein the first polymeric material has a melt flow rate of about 3 to about 8 grams per 10 minutes, and wherein the second polymeric material has dispersed therein an amount of electrically conductive particles that have a melt flow rate of about 2 to about 5 grams per 10 minutes (as determined by ASTM D-1238 at 230° C. under load of 2.16 kg).

7. The method of claim 1, wherein the first polymeric material and the second polymeric material each have a melt flow rate, and wherein the ratio of melt flow rate of the first polymeric material to the second polymeric material is about 0.1:1 to about 0.5:1.

8. The method of claim 1, wherein the first polymeric material and the second polymeric material comprise a thermoplastic, a thermoset, or an elastomer material; and wherein the electrically conductive particles comprise carbon black, carbon nanotube, carbon fiber, carbon nanotube wire, and any combinations thereof.

9. The method of claim 1, wherein the first polymeric material and the second polymeric material comprise a thermoplastic material selected from the group consisting of polyethylene, polypropylene, polycarbonate, polyamide, polyvinylchloride, polyvinylidene chloride, polyacrylonitrile, polystyrene and copolymers thereof, and any combinations thereof.

10. The method of claim 1, wherein the one or more outer layers comprise one or more decorative layers.

11. The method of claim 1, wherein the tubular workpiece comprises one conductive layer overlaid by one decorative layer, and wherein the conductive layer comprises polypropylene having carbon black filler dispersed therein, and the decorative layer comprises polypropylene.

* * * * *